(12) United States Patent
Yu

(10) Patent No.: US 8,887,168 B2
(45) Date of Patent: Nov. 11, 2014

(54) METHOD AND APPARATUS FOR MONITORING AND SHARING PERFORMANCE RESOURCES OF A PROCESSOR

(75) Inventor: Lei Yu, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 434 days.

(21) Appl. No.: 13/182,739

(22) Filed: Jul. 14, 2011

(65) Prior Publication Data

US 2013/0019248 A1    Jan. 17, 2013

(51) Int. Cl.
  *G06F 9/46*    (2006.01)
  *G06F 9/52*    (2006.01)
  *G06F 11/34*   (2006.01)

(52) U.S. Cl.
  CPC .............. *G06F 9/52* (2013.01); *G06F 2201/86* (2013.01); *G06F 2201/88* (2013.01); *G06F 11/3466* (2013.01); *G06F 11/3409* (2013.01); *G06F 11/3419* (2013.01)
  USPC ......................................................... 718/104

(58) Field of Classification Search
  None
  See application file for complete search history.

(56) References Cited

U.S. PATENT DOCUMENTS

| | | | | |
|---|---|---|---|---|
| 6,278,959 | B1 * | 8/2001 | Alferness | 702/186 |
| 7,284,061 | B2 * | 10/2007 | Matsubayashi et al. | 709/229 |
| 7,552,042 | B1 * | 6/2009 | Brebner et al. | 703/14 |
| 8,181,185 | B2 * | 5/2012 | Junkins et al. | 718/108 |
| 2002/0078121 | A1 * | 6/2002 | Ballantyne | 709/102 |
| 2006/0206897 | A1 * | 9/2006 | McConnell | 718/104 |
| 2006/0259274 | A1 * | 11/2006 | Greco et al. | 702/182 |
| 2010/0191508 | A1 * | 7/2010 | Lin et al. | 702/186 |

* cited by examiner

*Primary Examiner* — Gregory A Kessler
(74) *Attorney, Agent, or Firm* — Volpe and Koenig, P.C.

(57) ABSTRACT

A method and apparatus are described for managing a plurality of performance monitoring resources residing in a plurality of cores of a processor. A plurality of resource queues are maintained. Each resource queue corresponds to a particular one of the performance monitoring resources, and detects conflicts in use of the particular performance monitoring resource by multiple users. The detected conflicts associated with the particular performance monitoring resource are then resolved. A dynamic resource scheduler is used to resolve the detected conflicts, and is driven by an advanced programmable interrupt controller (APIC) timer residing in a particular core of the processor to provide each item, in an items list of a resource queue associated with the particular performance monitoring resource, an equal opportunity to use the particular performance monitoring resource for a predetermined period of time.

20 Claims, 4 Drawing Sheets

METHOD AND APPARATUS FOR MONITORING AND SHARING PERFORMANCE RESOURCES OF A PROCESSOR

FIELD OF INVENTION

The present invention is generally directed to managing system-wide performance resources of a processor.

BACKGROUND

FIG. 1A shows a conventional processor 100 including a plurality of cores $105_0, 105_1, \ldots, 105_N$. Each of the cores 105 may include an advanced programmable interrupt controller (APIC) timer 110, a plurality of performance monitor counters 115, an instruction based sampling (IBS) fetch control register 120, and an IBS operation (Op) control register 125, which are examples of system-wide performance monitoring resources that may be simultaneously required by many software applications.

FIG. 1B shows a conventional system including the processor 100, a plurality of drivers $135_1$ and $135_2$, a user interface 140 and a plurality of users $145_1$ and $145_2$. Referring to FIGS. 1A and 1B, a user 145 may make a time-based profile (TBP) request requiring use of an APIC timer 110, an event-based profile request requiring use of a performance monitor counter 115, or an IBS-based profile request requiring use of either an IBS fetch control register 120 or an IBS operation control register 125. However, the performance monitoring resources in each of the cores 105 of the processor 100 may not be shared by more than one user 145 at a time. Instead, once any of these performance monitoring resources are accessed by a first user, all other users are denied access to these same resources. For example, an arbitration protocol, such as one defined by Microsoft, may use a particular performance monitoring resource in the processor 100. If a first user $145_1$ follows the arbitration protocol, a second user $145_2$ will be denied access to the particular performance monitoring resource. However, if the second user does not follow the arbitration protocol, multiple accesses to the same performance monitoring resource may cause a system crash or malfunction of performance monitoring.

The performance monitor counters 115 in the processor 100 of FIG. 1A may be used by system software to count specific performance events associated with an operation, (e.g., retired instructions). A performance counter may be incremented in order to track the number of events that occur, (e.g., used for a sampling profile), as well as generate an interrupt when a predetermined threshold is reached, (i.e., the counter overflows). IBS is a code profiling mechanism that enables the processor 100 to select a random instruction fetch or micro-Op associated with an operation after a predetermined threshold, (e.g., number of cycles, instruction fetch count, instruction micro-Op dispatch count), has been reached, record specific performance information about the operation and generate an interrupt when the operation is completed. An interrupt handler in a driver 135 shown in FIG. 1B may then read the performance information that was logged for the operation. Instruction fetch sampling provides information about instruction translation look-aside buffer (TLB) and instruction cache behavior. The data collected for instruction fetch performance is different from the data collected for instruction execution performance.

Event counter multiplexing is a well-known technique used in hardware performance profiling. The event multiplexing technique allows one user to use many hardware events on a limited number of performance counters in a timeshared manner. However, by itself, event counter multiplexing does not support simultaneous performance monitoring resource usage by many other users.

Another well-known technique is to use a performance monitoring unit (PMU) arbitration library for resource management. However, a PMU arbitration library does not resolve conflicts to shared performance monitoring resources. For example, if a performance resource is accessed by a user, other requests to use the same performance monitoring resource are rejected.

Since the number of available performance resources in the processor 100 is limited, the applications that need to access these resources end up competing for the limited resources. Competing needs by these applications may cause a conflict when attempting to share performance monitoring resources. Thus, a management mechanism is needed to reduce conflicts associated with sharing performance monitoring resources to avoid a system crash or malfunction of performance monitoring.

SUMMARY OF EMBODIMENTS

A method and apparatus are described for managing a plurality of performance monitoring resources residing in a plurality of cores of a processor. A plurality of resource queues are maintained. Each resource queue corresponds to a particular one of the performance monitoring resources, and detects conflicts in use of the particular performance monitoring resource by multiple users. The detected conflicts associated with the particular performance monitoring resource are resolved.

Each resource queue may comprise a list of items. Each item may include at least one of a user identity, a resource configuration or stored data for resource virtualization. In response to a request to access a particular performance monitoring resource, an item may be added to an items list of the resource queue corresponding to the particular performance monitoring resource. In response to a cancellation of usage of access to the particular performance monitoring resource, an item may be removed from an items list of the resource queue corresponding to the particular performance monitoring resource.

Each resource queue may comprise a header including a count of usage on a corresponding performance monitoring resource indicating a number of users that are granted access to the corresponding performance monitoring resource. A count of usage that is greater than one may indicate that there is a potential conflict for resource usage.

A dynamic resource scheduler may be used to resolve the detected conflicts, and is driven by an advanced programmable interrupt controller (APIC) timer residing in a particular core of the processor to provide each item, in an items list of a resource queue associated with the particular performance monitoring resource, an equal opportunity to use the particular performance monitoring resource for a predetermined period of time.

A performance monitoring resource interrupt associated with a specific one of the performance monitoring resources may be detected. Performance data may be reported to the users when the detected performance monitoring resource interrupt is an event-based interrupt or an instruction based sampling (IBS) interrupt. At least one of switching performance monitor resource usage to a different user or reporting performance data to the users may be performed, when the detected performance monitoring resource interrupt is a time-based interrupt.

A sample collection unit may be used to collect performance data from the specific performance monitoring resource. The collected performance data may be normalized and provided to the users. The number of items in an items list of a specific resource queue may be used as a weight multiplier that is applied to the collected performance data for a performance monitoring resource that corresponds to the specific resource queue.

A computer-readable storage medium may be configured to store a set of instructions used for manufacturing a semiconductor device for managing a plurality of performance monitoring resources residing in a plurality of cores of a processor external to the semiconductor device. The semiconductor device may comprise a plurality of resource queues. Each resource queue corresponds to a particular one of the performance monitoring resources, and is configured to track conflicts in use of the particular performance monitoring resource by multiple users. The semiconductor device may further comprise a dynamic resource scheduler configured to resolve a multi-user conflict associated with the particular performance monitoring resource. The instructions may be Verilog data instructions or hardware description language (HDL) instructions.

BRIEF DESCRIPTION OF THE DRAWINGS

A more detailed understanding may be had from the following description, given by way of example in conjunction with the accompanying drawings wherein.

DETAILED DESCRIPTION OF EMBODIMENTS

Figure 1A:
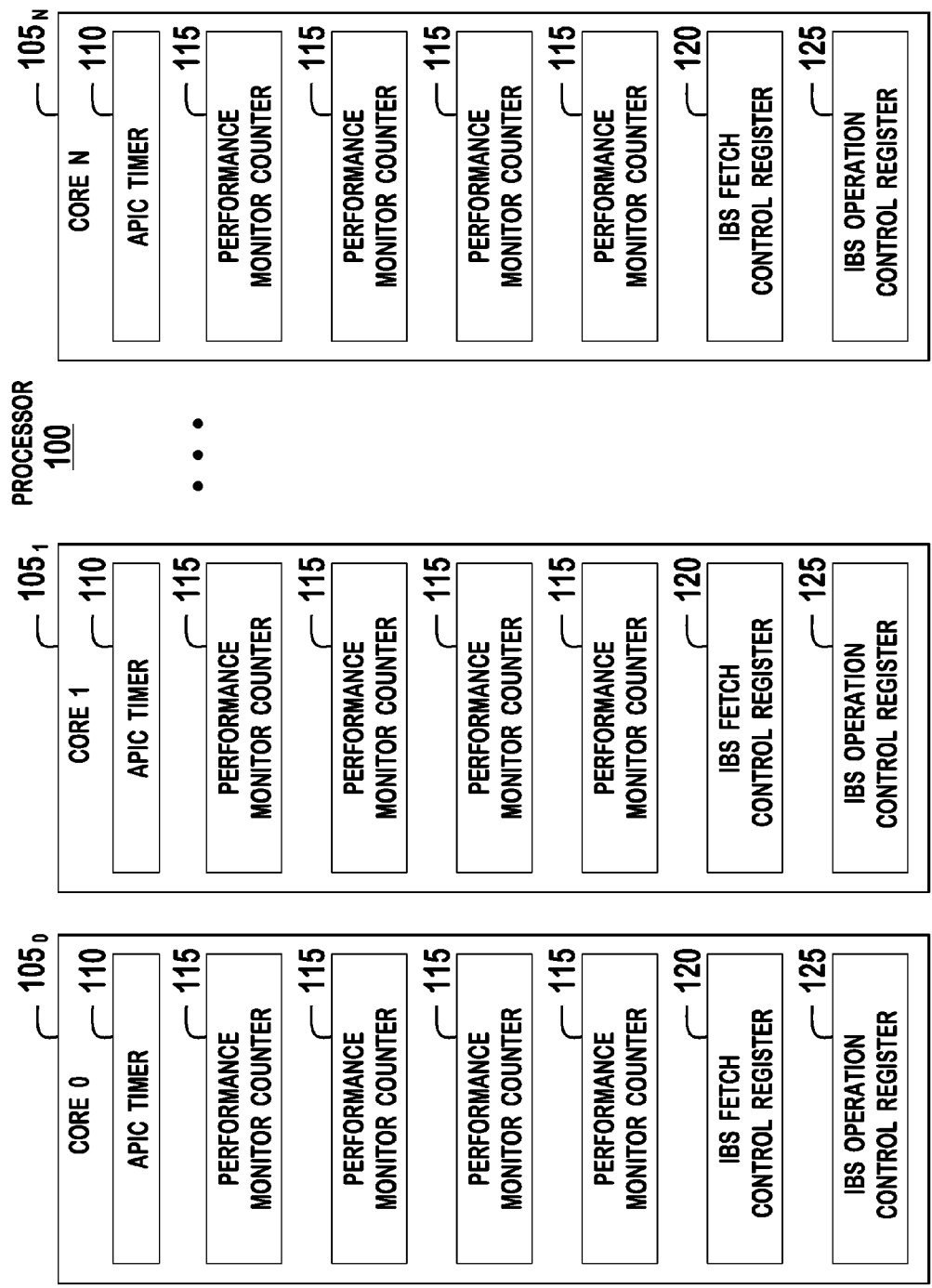
FIG. 1A shows a conventional processor including a plurality of performance monitoring resources.
Figure 1B:
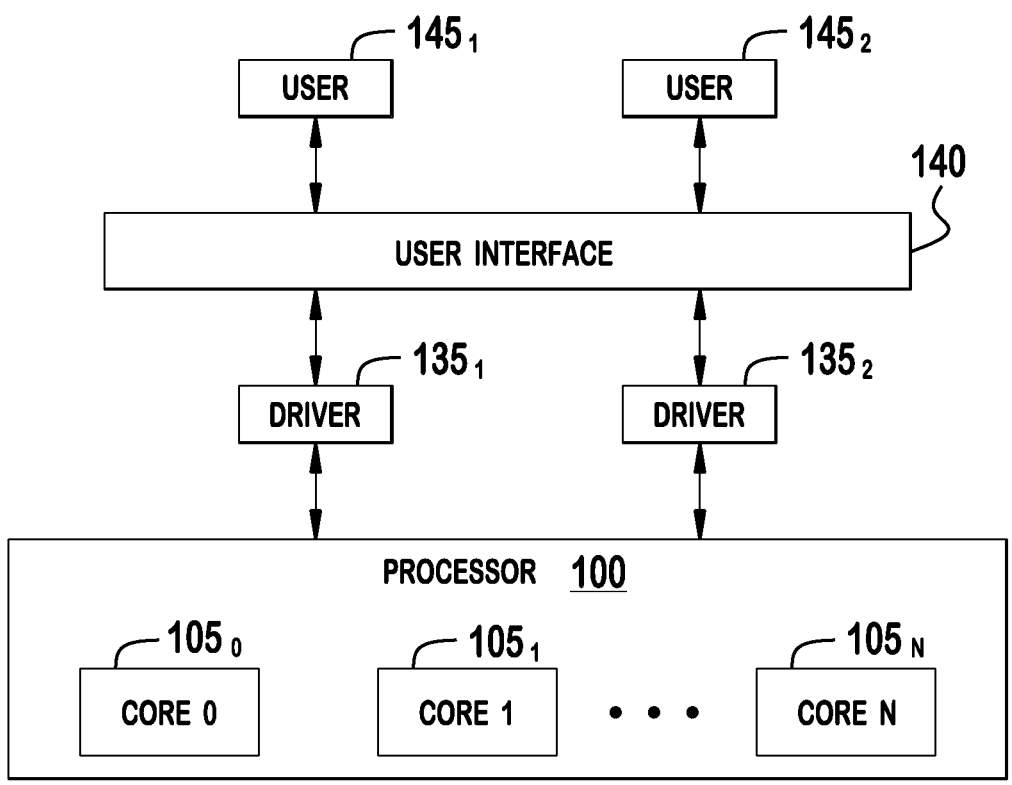
FIG. 1B shows a conventional system including the processor of FIG. 1A.
Figure 2:
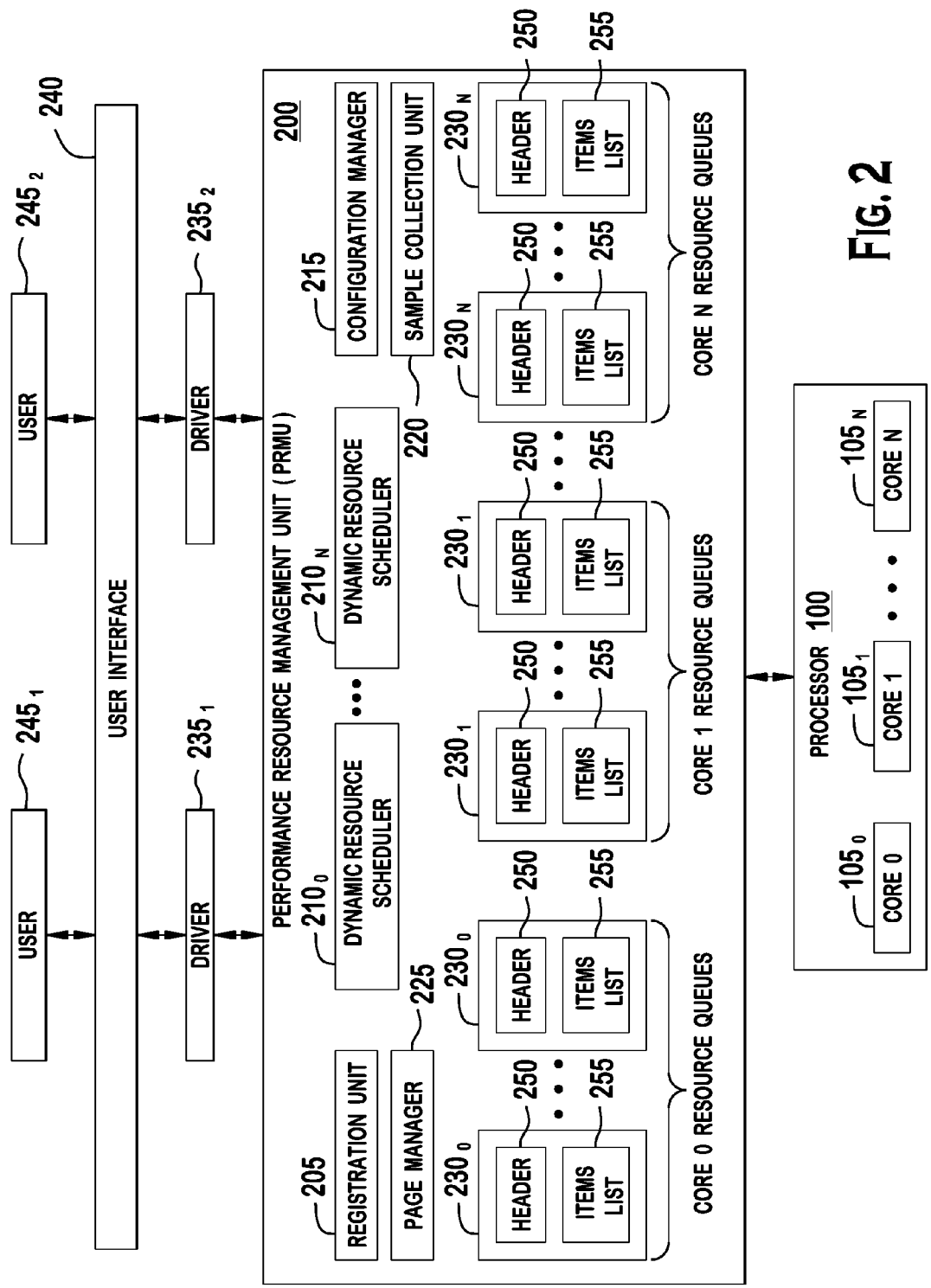
FIG. 2 shows a performance resource management unit that is configured to manage the resources in the cores of the processor of FIG. 1A in accordance with the present invention.

FIG. 2 shows a performance resource management unit (PRMU) 200 that is configured to manage system-wide performance monitoring resources, (e.g., the APIC timers 110, the performance monitor counters 115, the IBS fetch control registers 120, and the IBS operation control registers 125 in the cores 105 of the processor 100 shown in FIG. 1), in accordance with an embodiment of the present invention. The PRMU 200 may include a registration unit 205, a plurality of dynamic resource schedulers $210_0$-$210_N$, a configuration manager 215, a sample collection unit 220, a page manager 225 and a plurality of core resource queues $230_0$-$230_N$.

The PRMU 200 is configured to resolve resource sharing conflicts by dynamically assigning performance monitoring resources in response to time-based, event-based and IBS-based user requests. The PRMU 200 may be configured using software, hardware, or a combination of both software and hardware. The PRMU 200 may also normalize performance data dynamically. The PRMU 200 may resolve conflicts in performance monitoring resource sharing and allow multiple users to use performance monitoring resources in the cores 105 of the processor 100 simultaneously.

The registration unit 205 is responsible for adding and removing users 245. Each dynamic resource scheduler 210 is associated with a respective core 105 in the processor 100, and is configured to handle resource interrupts, swapping resource usage, and the like. The dynamic resource scheduler 210 may be activated in response to detecting a resource conflict and is driven by an APIC timer residing in the respective core 105. The dynamic resource scheduler 210 may automatically disable (i.e., deactivate, turn off) the APIC timer in the respective core 105 when the resource conflict has been resolved.

The configuration manager 215 is responsible for configuring input/output (TO) space, an interrupt vector table, configure the APIC timer and resources, (e.g., performance counters, IBS fetch control register, IBS operation control register), in the cores 105 of the processor 100, and the like.

The sample collection unit 220 is configured to collect performance data from a specific performance monitoring resource in the processor 100. The collected performance data may be normalized and passed to a driver 235 that interfaces the PRMU 200 with a user interface 240 accessed by a plurality of users 245. The page manager 225 performs page creation, deletion, data writing, page flushing and the like.

As shown in FIG. 2, a user 245 of performance monitoring resources registers with the PRMU 200. The registration unit 205 grants a UserID, which is used to identify the user 245. For each performance monitoring resource in the cores 105 of processor 100, the PRMU 200 maintains a corresponding queue 230 to contain information regarding usage of the performance monitoring resource. The queue 230 includes a header 250 and an items list 255. The header 250 may include a count of usage on the performance monitoring resource, (i.e., the number of users that are granted access/use of the resource), and an index of current usage. A count of usage that is greater than one (1) may indicate that there is a conflict for resource usage. Each item in the items list 255 in the resource queue 230 may include a UserID for the user 245 of the resource, a resource configuration, (e.g., the event to be monitored), stored data for resource virtualization, and other data (e.g., interrupt service routine callback).

When a user 245 wants to access a performance monitoring resource in a particular core 105 of the processor 100, the PRMU 200 may add an item (i.e., usage request) to the corresponding resource queue 230. If there is a resource conflict associated with a performance monitoring resource in a particular one of the cores 105 of the processor 100, the PRMU 200 activates a dynamic resource scheduler 210 that corresponds to the particular core 105. The dynamic resource scheduler 210 is driven by an APIC timer in the particular core 105 to resolve the resource conflict, after which the APIC timer is disabled. The dynamic resource scheduler 210 periodically wakes up, stops the current hardware resource usage, stores data for the current resource usage, moves the next item in the corresponding resource queue 230 to the current item, and configures the current item onto the conflicted performance monitoring resource. The dynamic resource scheduler 210 provides every item in the corresponding resource queue 230 an equal chance to use the conflicted performance monitoring resource for a predetermined period of time. Thus, conflicts that arise due to resource sharing are resolved.

Each driver 235 communicates with the PRMU 200 and indicates which performance monitoring resource in the processor 100 a user 245 wants to access, how to use the performance monitoring resource and whether to switch performance resource usage to a different user. The PRMU 200 collects data from the performance monitoring resources in the cores 105 of the processor 100, and passes the collected data to the drivers 235.

When an interrupt occurs, the PRMU 200 determines which resource caused the hardware interrupt. The PRMU 200 passes the performance data, (e.g., an event sample), to a user 245 via a user-configured callback routine.

Since the items in the resource queue 230 share the performance monitoring resource in a time-wise manner, the PRMU 200 needs to apply dynamic normalization to reflect the true data. Normalization scales the performance data to obtain data that reflect the true (absolute) number of performance events. The number of items in the resource queue 230 is used as a weight multiplier, (i.e., scale factor), when the PRMU 200 reports the performance data to the user 245. For example, if there are three (3) items in an items list 255 of a resource queue 230 when an interrupt occurs, the PRMU 200 may collect a sample and report the occurrence of three (3) samples, (corresponding to the three items in the items list 255), rather than one (1) sample. If a user 245 cancels usage of a performance monitoring resource, the PRMU 200 removes the item from the resource queue 230 and reduces the count of resource usage. The weight multiplier changes accordingly.

If there no longer is a resource conflict across all performance monitoring resources in the cores 105 of the processor 100, the dynamic resource scheduler 210 may automatically disable the APIC timer. Since the APIC timer is used for both the sample collector 220 and for the dynamic resource scheduler 210, the PRMU 200 needs to distinguish between them and to determine when a sample is taken by the sample collector 220 and when the dynamic resource scheduler 210 is invoked. For example, if the granularity of the dynamic resource scheduler 210 is 1 ms, and the granularity of the sample collector 220 is 0.1 ms, the PRMU 200 may use current values, (i.e., remaining time before expiration of a timer-based sampling or scheduling interval), to keep track of the sample collector 220 and the dynamic resource scheduler 210. If the current remaining time of the dynamic resource scheduler 210 reaches zero, then the dynamic resource scheduler 210 indicates that it is time to invoke the sample collection unit 220, or vice versa. The configuration manager 215 in the PRMU 200 reconfigures the APIC timer as necessary.

Figure 3:
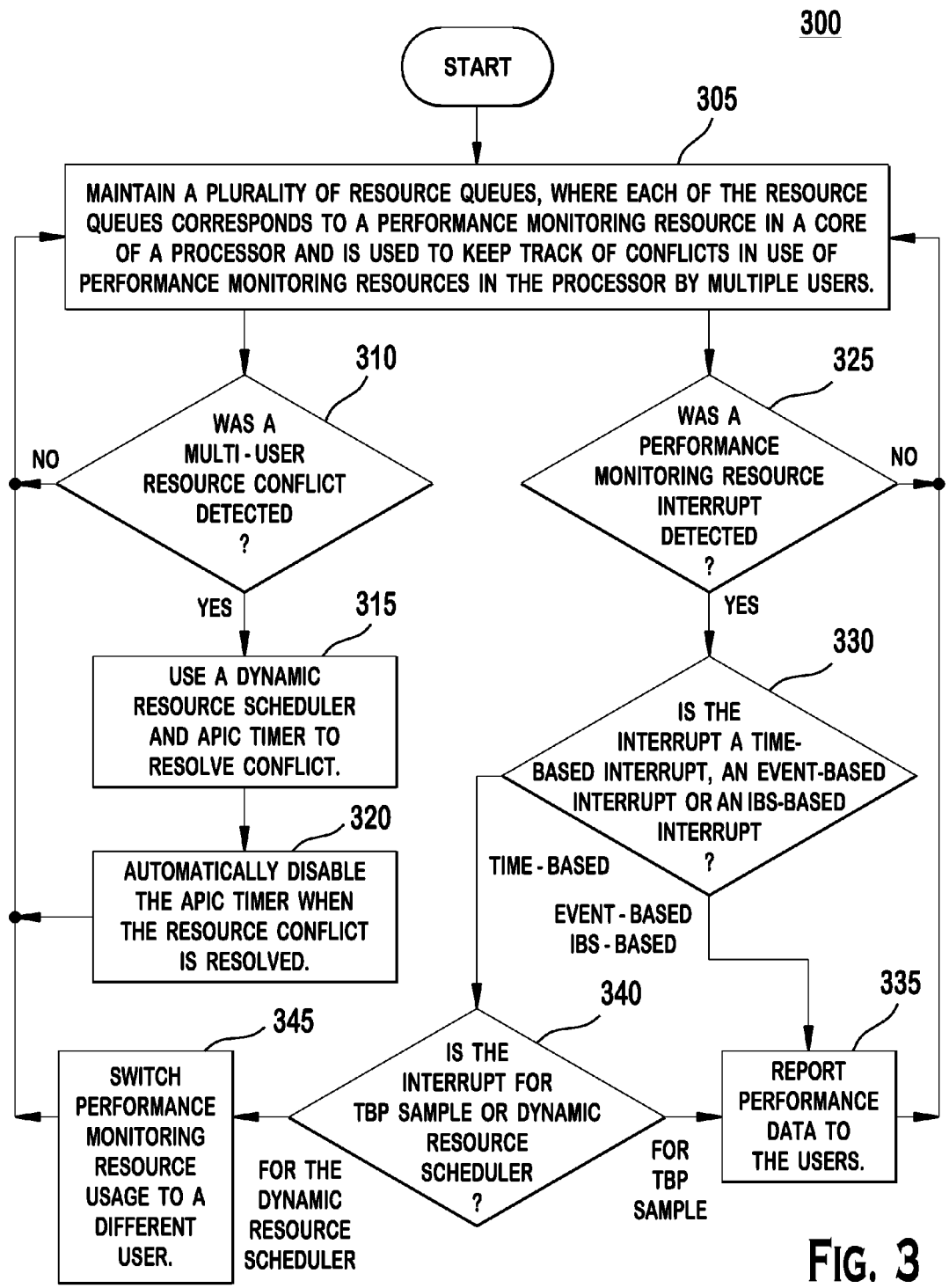
FIG. 3 is a flow diagram of a procedure for monitoring the allocation of processor core performance monitoring resources in accordance with the present invention.

FIG. 3 is a flow diagram of a procedure 300 for monitoring the allocation of processor core performance monitoring resources in accordance with the present invention. In step 305, a plurality of resource queues are maintained, where each of the resource queues corresponds to a performance monitoring resource in a core of a processor and is used to keep track of conflicts in use of performance monitoring resources in the processor by multiple users. In step 310, a determination is made as to whether or not a multi-user resource conflict was detected. If it is determined that a multi-user resource conflict was detected, a dynamic resource scheduler and APIC timer are used to resolve the conflict in step 315. In step 320, the APIC timer is automatically disabled when the resource conflict is resolved. In step 325, which may occur before, during or after any one of steps 310, 315 or 320, a determination is made as to whether or not a performance monitoring resource interrupt was detected. If it is determined that a performance monitoring resource interrupt was detected, a determination is made in step 330 as to whether the interrupt is a time-based interrupt, (requiring use of an APIC timer), an event-based interrupt, (requiring use of a performance monitor counter), or an IBS-based interrupt, (requiring use of either an IBS fetch control register or an IBS operation control register). For an event-based interrupt or an IBS-based interrupt, the performance data is reported to the users in step 335, and the procedure 300 returns to step 305. For a time-based interrupt, a determination is made in step 340 as to whether the time-based interrupt is for a TBP sample, or for the dynamic resource scheduler. If the time-based interrupt is for TBP sample, step 335 is performed. If the time-based interrupt is for the dynamic resource scheduler, the performance monitoring resource usage is switched to a different user in step 345. Alternatively, both steps 335 and 345 may be performed if the time-based interrupt is for the dynamic resource scheduler. After any one of steps 310, 320, 325, 335 or 345 is performed, the procedure 300 returns to step 305.

Although features and elements are described above in particular combinations, each feature or element can be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), an accelerated processing unit (APU), a DSP core, a controller, a microcontroller, application specific integrated circuits (ASICs), field programmable gate arrays (FPGAs), any other type of integrated circuit (IC), and/or a state machine, or combinations thereof.

What is claimed is:

1. A method of managing a plurality of performance monitoring resources residing in a plurality of cores of a processor, the method comprising:

maintaining a plurality of groups of resource queues, each group of resource queues being maintained for a respective one of the cores, each resource queue corresponding to a particular one of the performance monitoring resources residing in a particular one of the cores, whereby each resource queue detects conflicts in use of the particular performance monitoring resource by multiple users, and each resource queue comprises a list of items;

detecting a performance monitoring resource interrupt associated with a specific one of the performance monitoring resources;

using a sample collection unit to collect performance data from the specific performance monitoring resource; and applying a weight multiplier, based on the number of items in the items list of a specific resource queue, to the collected performance data for a performance monitoring resource that corresponds to the specific resource queue.

2. The method of claim 1 wherein each resource queue comprises a list of items, each item including at least one of a user identity, a resource configuration or stored data for resource virtualization.

3. The method of claim 2 further comprising:
in response to a request to access the particular performance monitoring resource, adding an item to an items list of the resource queue corresponding to the particular performance monitoring resource.

4. The method of claim 2 further comprising:
in response to a cancellation of usage of access to the particular performance monitoring resource, removing an item from an items list of the resource queue corresponding to the particular performance monitoring resource.

5. The method of claim 1 wherein each resource queue comprises a header including a count of usage on a corresponding performance monitoring resource indicating a number of users that are granted access to the corresponding performance monitoring resource.

6. The method of claim 5 wherein a count of usage that is greater than one indicates that there is a potential conflict for resource usage.

7. The method of claim 1 wherein a dynamic resource scheduler is used to resolve the detected conflicts, and is driven by an advanced programmable interrupt controller (APIC) timer residing in a particular core of the processor to provide each item, in an items list of a resource queue associated with the particular performance monitoring resource, an equal opportunity to use the particular performance monitoring resource for a predetermined period of time.

8. The method of claim 7 further comprising:
automatically disabling the APIC timer when the multi-user resource conflict has been resolved.

9. The method of claim 1 further comprising:
reporting performance data to the users when the detected performance monitoring resource interrupt is an event-based interrupt or an instruction based sampling (IBS) interrupt; and
performing at least one of switching performance monitor resource usage to a different user or reporting performance data to the users, when the detected performance monitoring resource interrupt is a time-based interrupt.

10. The method of claim 9 further comprising:
normalizing the collected performance data; and
providing the normalized data to the users.

11. Apparatus for managing performance resources, the apparatus comprising:
a processor including a plurality of cores;
a plurality of groups of resource queues, each group of resource queues being maintained for a respective one of the cores, each resource queue corresponding to a particular one of a plurality of performance monitoring resources residing in a particular one of the cores, whereby each resource queue is configured to detect conflicts in use of the particular performance monitoring resource by multiple users, and each resource queue comprises a list of items; and
a sample collection unit configured to:
collect performance data from a specific one of the performance monitoring resources associated with a performance monitoring resource interrupt; and
apply a weight multiplier, based on the number of items in the items list of a specific resource queue, to the collected performance data for a performance monitoring resource that corresponds to the specific resource queue.

12. The apparatus of claim 11 wherein each item includes at least one of a user identity, a resource configuration or stored data for resource virtualization.

13. The apparatus of claim 11 wherein each resource queue comprises a header including a count of usage on a corresponding performance monitoring resource indicating a number of users that are granted access to the corresponding performance monitoring resource.

14. The apparatus of claim 13 wherein a count of usage that is greater than one indicates that there is a potential conflict for resource usage.

15. The apparatus of claim 11 wherein the dynamic resource scheduler is driven by an advanced programmable interrupt controller (APIC) timer residing in a particular core of the processor to provide each item, in an items list of a resource queue associated with the particular performance monitoring resource, an equal opportunity to use the particular performance monitoring resource for a predetermined period of time.

16. The apparatus of claim 11 further comprising:
a sample collection unit configured to report performance data to the users when an event-based interrupt or an instruction based sampling (IBS) interrupt associated with the performance monitoring resources is detected.

17. The apparatus of claim 11 wherein the apparatus performs at least one of switching performance monitor resource usage to a different user or reporting performance data to the users, when a performance monitoring resource time-based interrupt is detected.

18. A non-transitory computer-readable storage medium configured to store a set of instructions used for manufacturing a semiconductor device for managing a plurality of performance monitoring resources residing in a plurality of cores of a processor external to the semiconductor device, wherein the semiconductor device comprises:
a processor including a plurality of cores;
a plurality of groups of resource queues, each group of resource queues being maintained for a respective one of the cores, each resource queue corresponding to a particular one of a plurality of performance monitoring resources residing in a particular one of the cores, whereby each resource queue is configured to detect conflicts in use of the particular performance monitoring resource by multiple users, and each resource queue comprises a list of items; and
a sample collection unit configured to:
collect performance data from a specific one of the performance monitoring resources associated with a performance monitoring resource interrupt; and
apply a weight multiplier, based on the number of items in the items list of a specific resource queue, to the collected performance data for a performance monitoring resource that corresponds to the specific resource queue.

19. The computer-readable storage medium of claim 18 wherein the instructions are Verilog data instructions.

20. The computer-readable storage medium of claim 18 wherein the instructions are hardware description language (HDL) instructions.

* * * * *